Figure 1:
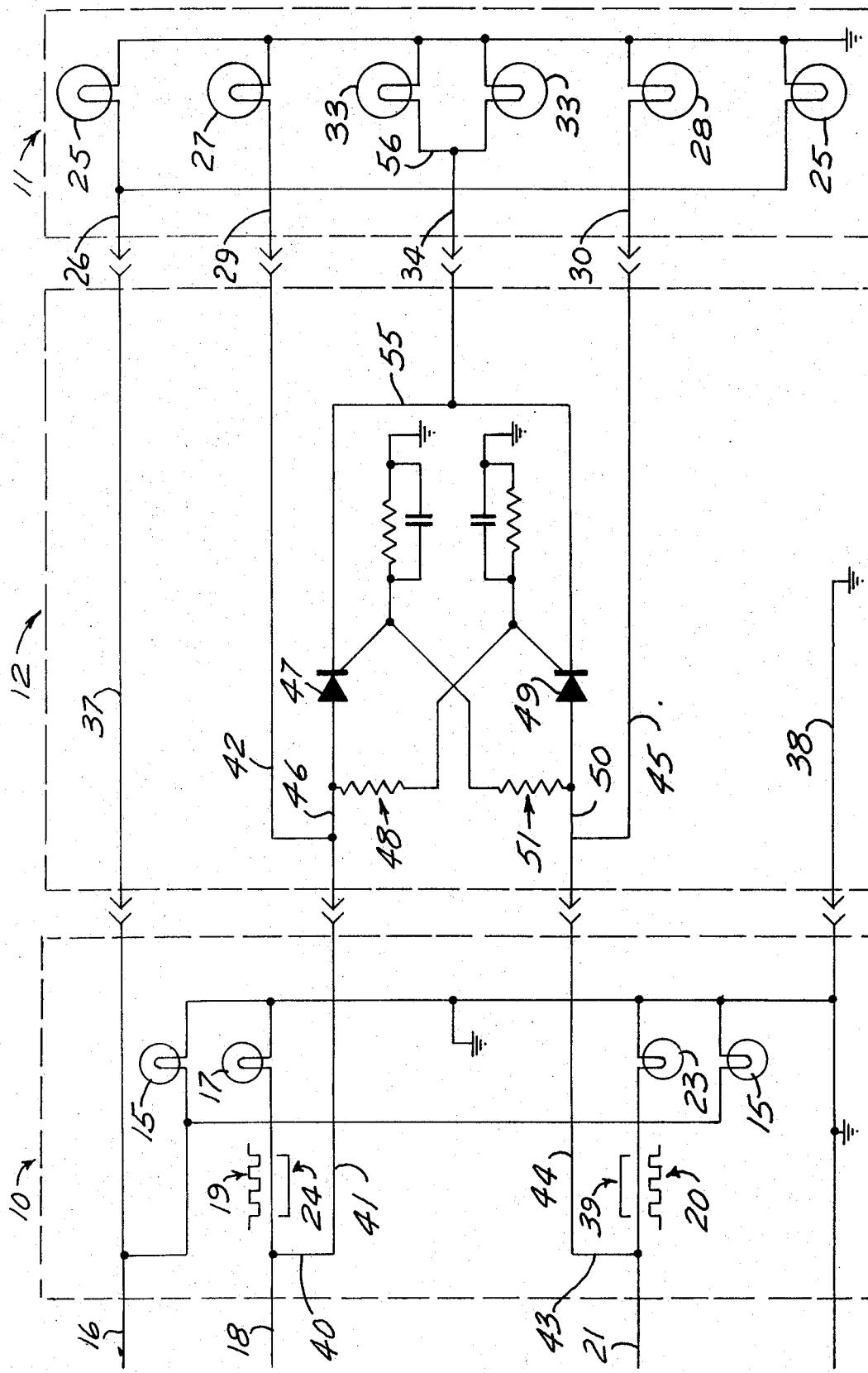

United States Patent [19]
Bryant

[11] 3,849,664
[45] Nov. 19, 1974

[54] VEHICLE WIRING ADAPTOR
[76] Inventor: Richard C. Bryant, 1960 Evergreen, LaVerne, Calif. 91750
[22] Filed: Nov. 8, 1973
[21] Appl. No.: 413,954

[52] U.S. Cl. .............................. 307/10 LS, 340/67
[51] Int. Cl. ............................................... H02g 3/00
[58] Field of Search ......... 307/10 R, 10 LS; 315/77, 315/82, 131, 132; 340/67

[56] References Cited
UNITED STATES PATENTS
| | | | |
|---|---|---|---|
| 2,989,645 | 6/1961 | Frieden | 307/10 R |
| 3,576,530 | 4/1971 | Buechler et al. | 340/67 X |
| 3,596,244 | 7/1971 | Litke | 340/67 |
| 3,659,267 | 4/1972 | Holt | 340/67 |

Primary Examiner—Robert K. Schaefer
Assistant Examiner—M. Ginsburg
Attorney, Agent, or Firm—Herbert E. Kidder

[57] ABSTRACT

The present invention relates to an adaptor for overcoming the incompatability between the turn/brake wiring circuitry of certain American and foreign-designed vehicles, particularly when the foreign vehicle is connected to the American vehicle and is being towed thereby, and the said turn/brake circuits of the two vehicles are interconnected so that use of brakes or turn signals on the tow vehicle causes the turn and brake lamps of the trailer vehicle to light up in the correct manner. This invention accomplishes this result by providing electrical paths that send the turn signals only to the turn lamps; and send the brake signals to the brake lamps and to those turn lamps that are not being used at the moment.

10 Claims, 1 Drawing Figure

VEHICLE WIRING ADAPTOR

BACKGROUND OF THE INVENTION

There is a basic inherent incompatibility between the electrical wiring of most American-designed road vehicles and most foreign-designed road vehicles; and when it becomes necessary or desirable to electrically interconnect such vehicles (as when one is being towed behind the other), the inherent wiring compatibility causes a serious problem. This problem arises primarily from the wiring of the turn-indicating circuitry and the braking-indicating circuitry; and this will be discussed in greater detail later.

It is well known that for many years it has been deemed necessary to incorporate braking indicators in the rear portion of road vehicles, in order to advise the following driver that the vehicle is slowing or stopping. Of late, safety considerations have dictated the additional inclusion of blinking or flashing turn indicators in the front and rear portions of the vehicles, in order to advise oncoming and following drivers that the vehicle is about to change lanes or make a turn.

The above turn indication and brake indication is, in general, achieved as follows: In the case of the turn indication, a pulsating electrical "turn signal" is applied to selected lamps; and these lamps thereupon produce an intermittent flashing illumination that corresponds to the pulsating turn signal. In the case of the braking indication, a continuous electrical "braking" signal is applied to selected lamps; and the lamps thereupon produce a continuous illumination that corresponds to the continuous braking signal.

There are two principal ways of incorporating the turn indicating lamps into the vehicle wiring; and the so-called foreign system will be discussed first. In the foreign system, the pulsating turn signal is applied to selected turn lamps; and the continuous braking signal is applied to brake lamps that are independent of the turn lamps. Therefore, in the foreign system, there is no electrical interconnection between the turn signal wiring and the braking signal wiring. On the other hand, in the American system, the same lamps (actually the same filaments) are used for both the turn signals and the braking signals; so that there is a built-in interconnection between the turn signal wiring and the braking signal wiring.

Assume now the following situation: the vehicle is slowing, so that it becomes necessary to show a braking indication, and that sequentially it becomes necessary to simultaneously show a turn indication. In the foreign system, this is accomplished by first applying a braking signal to the desired independent braking lamps, and by then applying a turn signal to the desired independent turn lamp. However, in the American system — since both signals use the same lamp — it becomes necessary to terminate the braking signal to the selected turn lamp, and to then provide instead a turn signal. It is therefore obvious that it is necessary, in the American system, to interconnect the turn signal wiring and the braking signal wiring in order to accommodate the above situation.

To provide a continuous braking signal, the vehicles use a brake switch that produces a braking signal (usually of battery voltage) for the time interval that the brake pedal is held depressed. To provide a pulsating turn signal the vehicle uses a "flasher" and a turn switch to produce a pulsating turn signal, and to direct the resultant pulsating turn signal to one or more selected turn lamps on a given side of the vehicle.

For convenience, these well known devices will be designated as "turn signal generating means" and "brake signal generating means."

The advantages of the foreign turn/brake system are as follows: the actual wiring is simple — as single wires run from the turn switch to each of the independent turn lamps. The turn switch may be relatively simple. There is no interconnection between the turn indicator system and the brake indicator system — so that trouble-shooting is relatively easy. The turn lamps may be put at any convenient position on the vehicle. The turn lamps may have any desired configuration and appearance. The turn lamps may be of any desired color, and may thus be distinguishable from the braking lights. Individual light bulbs are used in the individual turn and brake lamps. The turn indicator housings are physically separated from the braking indicator housings, and this design permits design advantages.

The advantages of the American system are as follows: the turn indicator and brake indicator use the same lamp, so that fewer lamps are needed. A smaller number of lamp sockets are required. The amount of wire is reduced. A single lamp housing accommodates the composite turn indicator and brake indicator — thus permitting unified design. The integral housing permits a more compact overall appearance. Bulb replacement is simplified. The wiring lends itself to the cabling technique used throughout the vehicle.

SUMMARY OF THE INVENTION

It is the principal object of the present invention to provide an adaptor for overcoming the inherent wiring incompatibility of certain American and foreign-designed vehicles.

It is another object of the present invention to provide a simple adaptor.

It is still another object of the present invention to provide an adaptor that may be permanent, temporary, or may be installed on an existant vehicle.

It is a further object of the present invention to provide an adaptor that is of solid-state components, and is long-lived.

It is a still further object of the present invention to provide an adaptor that will function automatically and satisfactorily with a minimum of attention, upkeep and maintenance.

The attainment of the above objects and others will be realized from a study of the following specification taken in conjunction with the drawing, of which FIG. 1, the only FIGURE in the case, shows an overall schematic electrical diagram of an interconnected system.

Broadly speaking, the present invention uses switching circuitry — such as Silicon Control Rectifier — for selectively controlling the electrical paths along which the lamp signals flow to the brake lamps. During the use of turn signals, the switches are open; during the use of the brake signals, the switches are closed; and during the simultaneous use of one turn signal and a braking signal, one turn switch is open and one switch is closed.

Many drivers of larger recreation vehicles (motor homes, busses, campers, vans, etc.) find it desirable to tow a small vehicle (typically of foreign design) for use as basic transportation once the larger vehicle has been parked at a suitable site. During the towing operation, it is essential—for safety, and for legal reasons — that the trailing towed vehicle display turn indications and braking indications to drivers of following vehicles. Therefore, it becomes necessary for the towed vehicle to have turn/brake indicators activated by the towing vehicle; and, as indicated above, this introduced the above-discussed problem.

The present invention will be better understood from FIG. 1 of the drawing, wherein the reference character 10 designates an American turn/brake electrical system of the towing vehicle; reference character 11 designates a foreign turn/brake electrical system of the towed vehicle; and reference character 12 designates the disclosed adaptor circuitry.

It will be noted that the American-type turn/brake electrical system circuitry 10 comprises a plurality of running lamps, clearance lamps, tail lamps, license plate illuminating lamps, etc., 15, that are connected in parallel, and are energized by an energizing wire 16 controlled by the lighting switch (not shown) of the towing vehicle. Circuitry 10 also comprises a composite right turn/brake lamp 17 that is energized by an energizing wire 18 connected to a standard brake/turn signal generator as discussed above.

When a turn-indicating pulsating right turn electrical signal 19 is applied over wire 18, the lamp 17 becomes illuminated intermittently to provide a flashing indicating visual signal; and since the flashing light 17 is at the right side of the vehicle, its flashing indicates a right turn. Similarly, when a left-turn-indicating pulsating electrical signal 20 is applied over wire 21, the composite turn/brake lamp 23 becomes illuminated intermittently to provide a flashing turn-indicating visual signal; and, since the flashing light 23 is at the left side of the vehicle, its flashing indicates a left turn.

When a continuous electrical braking signal 24 is applied over wire 18, lamp 17 becomes illuminated continuously to indicate a slowing down or a stopping of the vehicle. Similarly, when a continuous electrical braking signal 39 is applied over wire 21, lamp 23 becomes illuminated continuously, to also indicate a slowing down or stopping of the vehicle.

It should be noted that American-type turn/brake lamps 17 and 23 are such that the same filament is used for both the turn and the braking indication; lamps 17 and 23 producing a flashing visual indication when the filament is energized by a pulsating electrical turn signal (19, 20) and producing a continuous visual indication when the filament is energized by a continuous electrical braking signal (24, 39).

In the situation wherein a braking signal must be provided simultaneously with a turn signal, the signal generator means provides a pulsing turn signal to the selected turn lamp 17 or 23 to indicate the desired direction of turn; and simultaneously provides a continuous braking signal to the other lamp 23 or 17 to produce the braking indication.

Referring now to the foreign turn/brake electrical system 11, it will be seen that this comprises a plurality of running or clearance lamps 25 that are connected in parallel, and are energized by an energizing wire 26. Circuitry 11 also comprises an independent right turn lamp 27 and an independent left turn lamp 28; these being energized by wires 29 and 30 respectively. Circuitry 11 also comprises one or more brake lamps 33 that are energized by a wire 34.

It will be realized that in the foreign turn/brake system, the turn lamps 27 and 28 are independent of one another and of the brake lamps 33.

FIG. 1 shows an adaptor 12 for causing the American-type turn/brake electrical system to activate the foreign-type turn/brake electrical system. The circuitry of adaptor 12 comprises a through wire 37 that directly interconnects the running lights of the towing vehicle circuitry with the running lights of the towed vehicle circuitry 11. Adaptor 12 also comprises grounding wires 38 that provide a common ground for all of the circuitry.

When the brake of the towing vehicle is applied, a braking signal generator produces the continuous electrical braking signal 24, which is used in three ways. First of all, in circuit 10, the continuous braking signal 24 is applied from wire 18 to illuminate the composite turn/brake lamp 17; and the other continuous braking signal 39 is applied over wire 21 to illuminate the composite turn/brake lamp 23. Since the brake signals 24 and 39 are continuous for as long an interval as the brake is applied, the lamps 17 and 23 remain continuously illuminated for the duration of the braking signals. When the brake pedal is released, the brake signals 24 and 39 — and thus the braking illumination — are terminated. In this way, the braking signals 24 and 39 illuminate the brake lights of the towing vehicle.

The second way that the braking signals 24 and 39 are used is as follows: The braking signal 24 at wire 18 is applied over wires 40, 41, 42 and 29 to the right turn lamp 27 of the towed vehicle, and since the brake signal 24 is continuous, the right turn lamp 27 remains lighted for the duration of the braking signal — so that the right turn lamp 27 of the towed vehicle now acts as an additional continuously-on braking indication.

Similarly, the braking signal 39 at wire 21 is applied over wires 43, 44, 45 and 30 to the left turn lamp 28 of the towed vehicle; and since the brake signal 39 is continuous, the left turn lamp 28 of the towed vehicle remains illuminated for the duration of the braking signal — so that the left turn lamp 28 also acts as an additional continuously-on braking indication.

The third way that the braking signals are used is as follows: The braking signal 24 at wire 18 is applied over wires 40, 41 and 46 to the "anode" electrode of a solid-state electronic element 47 known as a Silicon Control Rectifier (SCR).

A slight digression is now desirable to discuss the SCR 47, which has an "anode," a "trigger electrode," and a "cathode." As indicated by its designation "rectifier," the SCR 47 — under the proper conditions — transmits electricity in only a given direction. The proper conditions for activating an SCR contains two requisites, the first of which is that there must be a suitable operating voltage applied across the anode/cathode portion of the SCR; and the second requisite being that there must be a suitable trigger signal applied to the trigger electrode of the SCR. The satisfying of these two requisites causes the SCR to become electrically conductive — and once it becomes thus conductivated, the trigger electrode becomes ineffective — and cannot turn off the current flow to the SCR. The SCR becomes nonconductive when the operating voltage across it is removed or is decreased to a predetermined turn-off value. Thus, the SCR functions as a switch.

Returning again to the discussion of the braking signals, it will be noted that the braking signal 24 at wire 18 is applied directly to the anode of SCR 47; and, since the cathode of SCR 47 is connected to ground through the lamps 33, the braking signal 24 applied to the anode of SCR 47 thus places a suitable operating voltage across SCR 47. Simultaneously, the braking signal 24 at wire 18 is also applied over wires 40, 41, 46 and a coupling resistor 48, to the trigger electrode of another SCR, 49, to produce a trigger signal whose effect will be discussed later.

It should be noted that the braking signal 39 at wire 21 is applied over wires 43, 44 and 50 to the anode of the second SCR 49 — thus placing an operative voltage across the second SCR 49. Simultaneously, the braking signal 39 at wire 21 is also applied over wires 43, 44, 50 and a second coupling resistor 51 to the trigger electrode of the first SCR 47 — to produce a trigger signal whose effect will also be discussed later.

In this way each SCR (47 and 49) has the requisite conditions for operation; that is, each has a suitable operating voltage across it, and each has a suitable trigger signal applied to its trigger electrode. Therefore, both SCRs 47 and 49 become conductive; and they transmit the braking signals 24 and 39 to wires 55, 34 and 56 to illuminate brake lamps 33 of the towed vehicle.

Thus, when the brake pedal of the towing vehicle is depressed, the resultant braking signals; (A) cause braking illumination of the turn/brake lamps 17 and 23 of the towing vehicle; (B) cause braking illumination of the brake lamps 33 of the towed vehicle; and (C) cause braking illumination of the turn lamps 27 and 28 of the towed vehicle.

Directing attention again to the circuitry of adaptor 12, it will be seen that when the right turn pulsating turn signal 19 is present at wire 18, this pulsating turn signal is applied directly to the right turn lamp 17 of the towing vehicle; and is simultaneously applied over wires 40, 41, 42 and 29 to the right turn lamp 27 of the towed vehicle. Thus, the right turn lamp 17 of the towing vehicle, and the right turn lamp 27 of the towed vehicle both produce a flashing visual indication.

It should also be noted that the pulsating right turn signal 19 at wire 18 is also applied over wires 40, 41 and 46 to SCR 47. Thus, the pulsating intermittent right turn signal 19 provides an intermittent operating voltage for SCR 47; however, there is no trigger signal for SCR 47, and this results in SCR 47 remaining non-conductive, in which state it will not transmit the pulsating electric signal 19. Thus, upon suitable generation and application of the right turn signal 19, the right turn lamps — only — of both vehicles becomes operative.

As soon as the pulsating right turn signal 19 is terminated, both of the right turn lamps 17 and 27 are extinguished.

The left turn circuitry is similar to that described above; a left turn signal 20, using wires 21, 43, 44, 45 and 30 in the same manner to flash both the left turn lamp 23 of the towing vehicle and the left turn lamp 28 of the towed vehicle. The pulsating left turn signal 20 is intermittently applied to the second SCR 49; but since no trigger signal is available, SCR 49 remains non-conductive.

Thus, upon suitable generation and application of the left turn signal 20, the left turn lamps — only — of both vehicles become operative, to be extinguished upon termination of the left turn signal 20.

The above discussion indicates that, in the case of turn signals, no trigger signal was produced at the SCRs; and the reason for this will be understood from the following explanation. Under ordinary conditions, the right turn signal 19 is not produced at the same time as the left turn signal 20, because there is no need for both of them simultaneously — and besides, the simultaneous production of a right turn signal and a left turn signal would be confusing to other drivers.

When the pulsating right turn signal 19 is being produced it — acting through wires 40, 41, 46 and coupling resistor 48 — produces an intermittent cyclic trigger signal at the trigger electrode of the second SCR 49. However, during this time interval — as discussed above — there is no left turn signal 20 — so that even though the second SCR 49 receives an intermittent trigger signal, SCR 49 does not have an operating voltage across it. Therefore, the second SCR 49 does not become conductive when a right turn signal is being produced.

Meanwhile, the right turn signal 19 is providing an intermittent cyclic operating voltage for SCR 47; but since there is no left turn signal 20, there is no trigger signal for SCR 47. Therefore, SCR 47 does not become conductive when a right turn signal 19 is being produced.

Since neither SCR 47 nor SCR 49 is conductivated, no signal — either turn or braking — is transmitted to the brake lamps 33 of the towing vehicle; and the lamps 33 of the towed vehicle remain off during the production of the right turn signal.

A similar analysis may be made for the left turn signal 20; and would show that in this case the lamps 33 also remain off.

It will be noted that each SCR, 47 and 49, has a capacitor connected between the trigger electrode and ground for the purpose of "integrating" the signals applied to the trigger electrode; in this way assuring that a suitable electric charge is maintained on the trigger electrode of the SCRs. It will also be noted that each SCR has a leakage resistor connected between the trigger electrode and ground to prevent the accumulation of excess electric charges on the trigger electrode. In this way, the resistor and the capacitor coact to produce an R/C timing circuit that provides optimal electric charge on the trigger electrodes of the SCRs.

It was pointed out above that there are situations that have a need for simultaneous turn signal and a braking signal; and the disclosed adaptor transmits such a combination to the towed vehicle in the following manner:

In the above situation, assume that the previously-mentioned signal generator provides a pulsating right turn signal 19 at wire 18, and simultaneously provides a continuous braking signal 39 at wire 21 — this combination of right turn and braking signals causing lamps 17 and 23 of the towing vehicle to provide flashing and continuous illumination respectively.

The disclosed adaptor operates as follows. The pulsating right turn signal 19 at wire 18 is transmitted over wires 40, 41, 42 and 29 to the right turn lamp 27 of the towed vehicle, causing it to flash to indicate a right turn. Thus, the right turn signal 19 illuminates the right turn lamp 17 of the towing vehicle and the right turn lamp 27 of the towed vehicle. The pulsating right turn signal 19 at wire 18 is also applied over wires 40, 41 and 46 to the anode of SCR 47, where it provides an intermittent operating voltage — and the action of SCR 47 will be discussed later. The pulsating right turn signal 19 at wire 18 is also applied over wires 40, 41, and 46, and coupling resistor 48, to provide a cyclic trigger signal for the second SCR 49, the action of which will also be discussed later.

The continuous braking signal 39 at wire 21 is applied over wires 43, 44, 45 and 30 to the left turn lamp 28 of the towed vehicle; causing it to be illuminated continuously to provide a braking indication. The continuous braking signal 19 at wire 21 is also applied over wires 43, 44 and 50 to the second SCR 49, where it provides a continuous operating voltage. SCR 49 now has its two requisite conditions; an operating voltage from braking signal 39, and a cyclic trigger signal from turn signal 19 — and at the first time-coincidence of these two signals, SCR 49 becomes conductive. At this time, it transmits the continuous braking signal 39 to wires 55, 34 and 56, causing the brake lamps 33 of the towed vehicle to be continuously illuminated to provide a braking indication.

It was pointed out above that once an SCR is activated and becomes conductive, it remains conductive despite removal of the trigger signal. Thus, once SCR 49 becomes conductive, it remains in this conductive state even when its trigger signal (obtained from pulsating turn signal 19) disappears. Therefore, the brake lamps 33 of the towed vehicle become, and remain, illuminated for the duration of the continuous braking signal 39 at wire 21. When this braking signal 39 is terminated, the SCR 49 becomes non-conductive because of the loss of its operating voltage; and the brake lamps 33 are then extinguished.

It will be noted that the SCR 47 has an intermittent operating voltage, obtained from the pulsating turn signal 19, and has a continuous trigger signal obtained from the continuous braking signal 39. At the first time-coincidence of the positive-pulse portions of these two signals, SCR 47 becomes conductive. At this time it transmits the turn signal 19 to wires 55, 34 and 56, causing the brake lamps 33 to become illuminated. Meanwhile, however, the brake lamps 33 have been illuminated through SCR 49, so that the conductivity of SCR 47 does not have any appreciable effect on the brake lamps 33.

As soon as the intermittent characteristic of the pulsating turn signal 19 produces the negative pulse portion of the turn signal 19, this causes the disappearance of the operating voltage across SCR 47; so that SCR 47 becomes non-conductive — breaking the electrical circuit to the brake lamps 33. However, the brake lamps 33 remain illuminated through the conductive SCR 49, so that the alternate conductivity and non-conductivity of SCR 47 does not have any appreciable effect on the brake lamps, which remain illuminated continuously in response to the continuous braking signal 39.

In this way, the disclosed adaptor permits the towing vehicle to cause the towed vehicle to produce a flashing-light turn indication at its right turn lamp 27; and to produce a continuous braking indication at its left turn lamp 28 and at its braking lamps 33.

A similar analysis will show that a left turn and braking indication may be produced; and in that case the first SCR 47 becomes conductive to permit the braking illumination of lamps 27 and 33.

It is known that late models of American-built vehicles have an emergency flasher system, wherein all of the turn lamps flash simultaneously; this result being achieved by providing a common pulsating signal that is applied to all of the turn indicating lights. In such a case, the disclosed adaptor operates as follows:

The common pulsating signal at wires 18 and 21 is applied simultaneously to all of the right turn lamps and to all of the left turn lamps of the two vehicles as discussed above — using wires 42 and 45. Moreover, the common pulsating signal now provides a simultaneous operating voltage and trigger signals for both SCRs 47 and 49. It should be noted that both SCRs 47 and 49 become conductive simultaneously, for the positive portions of the common pulsating signal, and become non-conductive at the termination of the positive-pulse portions of the signal. Therefore, the brake lights 33 of the towed vehicle also flash intermittently and simultaneously.

In this way, the towed vehicle is also provided with an emergency flashing system that is actuated by the apparatus in the towing vehicle.

It has been found desirable to provide the disclosed adaptor 12 as a "black box" that may be permanently installed, or added whenever and wherever it is needed. In the case of permanent installation, it is preferable that the various electrical connections also be made permanent; and it is thus preferable to use soldered joints, although connecting devices such as wire nuts or the like may be satisfactory. In the case of an add-on black box, it has been found preferable for the wires from adaptor 12 to terminate at suitable junction blocks or plug/socket combinations. For temporary use, the wires may terminate in clamps or the like.

The present invention has a number of important advantages. The chief advantage is that it overcomes the incompatability of certain turn/brake wiring circuits of American and foreign-designed vehicles when the said vehicles are connected together, with one towing the other. It accomplishes this easily and automatically. The invention is universal for these types of turn/brake systems, and may be installed as a permanent installation, or as a temporary expedient. Other advantages are that the device is extremely compact, simple, inexpensive and long-lived.

The expression "foreign-type turn/brake circuit" as used in the claims, does not necessarily refer to national origin, but includes any turn/brake circuit, regardless of origin, in which the flashing turn signal lamp filament is independent of the brake signal lamp filaments.

By the same token, the expression "American-type turn/brake circuit" includes any turn/brake circuit, regardless of national origin, in which the same lamp filaments are used for both turn signals and brake signals, and means is employed to inactivate the brake signal circuit on one side when the turn signal for that side is activated.

While I have shown and described in considerable detail what I believe to be the preferred form of the invention, it will be understood that the invention is not limited to such details, but might take various other forms within the scope of the claims.

What I claim is:

1. An adaptor for causing the American-type turn/brake circuit of a first road vehicle to selectively energize turn lamps and brake lamps of the turn/brake circuit of a second, foreign-type vehicle, said first vehicle having independent first and second composite turn/brake lamps, said second vehicle having independent first and second turn lamps and at least one independent brake lamp, said adaptor including connecting means and comprising:

means for providing a first electrical connection between said first composite turn/brake lamp of said first vehicle and said first independent turn lamp of said second vehicle;

whereby said first turn lamp of said second vehicle is adapted to function as either a turn lamp or a brake lamp, depending upon the electrical signal present at said first composite turn/brake lamp of said first vehicle;

means for providing a second electrical connection between said second composite turn/brake lamp of said first vehicle and said second independent turn lamp of said second vehicle;

whereby said second turn lamp of said second vehicle is adapted to function as either a turn lamp or a brake lamp, depending upon the electrical signal present at said second composite turn/brake lamp of said first vehicle;

means, comprising a first switch, for providing a third electrical connection between said first composite turn/brake lamp of said first vehicle and said independent brake lamp of said second vehicle;

means, comprising a second switch, for providing a fourth electrical connection between said second composite turn/brake lamp of said first vehicle and said independent brake lamp of said second vehicle;

whereby said brake lamp of said second vehicle is adapted to function as a brake lamp when permitted by the state of said switches.

2. The invention of claim 1 wherein said first and second switches comprise respective first and second Silicon Control Rectifiers, each said SCR having an anode and a trigger electrode;

said anode of said first SCR adapted to be electrically connected to said first composite turn/brake lamp of said first vehicle, said trigger electrode of said first SCR adapted to be electrically connected to said second composite turn/brake lamp of said first vehicle;

said anode of said second SCR adapted to be electrically connected to said second composite turn/brake lamp of said first vehicle, said trigger electrode of said second SCR adapted to be electrically connected to said first composite turn/brake lamp of said first vehicle.

3. The invention of claim 2 wherein said SCRs comprise cathodes adapted to be electrically connected to said brake lamp of said second vehicle.

4. The invention of claim 2 wherein wherein the last two mentioned means include respective coupling resistors adapted to be connected between said trigger electrodes of said SCRs and respective turn/brake lamps.

5. The invention of claim 3 wherein the last two mentioned means includes respective capacitor means for integrating the charges on said trigger electrodes of said SCRs.

6. The invention of claim 3 wherein the last two mentioned means includes leakage resistor means for preventing excessive electrical charges from accumulating on said trigger electrodes of said SCRs.

7. The invention of claim 3 wherein the last two mentioned means includes respective R/C timing circuit means, electrically connected to said trigger electrodes of said SCRs, for providing an optimal charge to be maintained on said trigger electrodes of said SCRs.

8. The invention of claim 3 wherein said connecting means includes connection means for interconnecting running lamps of said first vehicle with running lamps of said second vehicle.

9. The invention of claim 3 wherein said connecting means includes grounding means for establishing a common ground for said vehicles and said adaptor.

10. An adaptor for causing an American-type turn/brake circuit of a first road vehicle to selectively energize turn lamps and brake lamps of the foreign turn/brake circuit of a second road vehicle, said first vehicle having independent first and second composite turn/brake lamps, said second vehicle having independent first and second turn lamps and at least one independent brake lamp, said adaptor comprising:

means for providing a first electrical connection between said first composite turn/brake lamp of said first vehicle and said first independent turn lamp of said second vehicle;

whereby said first turn lamp of said second vehicle is adapted to function as either a turn or brake lamp, depending upon the electrical signal present at said first composite turn/brake lamp of said first vehicle;

means for providing a second electrical connection between said second composite turn/brake lamp of said first vehicle and said second independent turn lamp of said second vehicle;

whereby said second turn lamp of said second vehicle is adapted to function as either a turn or brake lamp, depending upon the electrical signal present at said second composite turn/brake lamp of said first vehicle;

means, comprising a first Silicon Control Rectifier, for providing a third electrical connection between said first composite turn/brake lamp of said first vehicle and said independent brake lamp of said second vehicle;

means, comprising a second Silicon Control Rectifier, for providing a fourth electrical connection between said second composite turn/brake lamp of said first vehicle and said independent brake lamp of said second vehicle;

each said SCR having an anode and a cathode and a trigger electrode;

said anode of said first SCR adapted to be electrically connected to said first composite turn/brake lamp of said first vehicle, said trigger electrode of said first SCR adapted to be electrically connected to said second composite turn/brake lamp of said first vehicle;

said anode of said second SCR adapted to be electrically connected to said second composite turn/brake lamp of said first vehicle, said trigger electrode of said second SCR adapted to be electrically connected to said first composite turn/brake lamp of said first vehicle;

said cathodes adapted to be electrically connected to said brake lamp of said second vehicle;

respective coupling resistors connected to said trigger electrodes of said SCRs and adapted to be connected to respective turn/brake lamps;

respective R/C timing circuit means, electrically connected to said trigger electrodes of said SCRs, for providing an optimal charge to be maintained on said trigger electrodes of said SCRs;

connection means for interconnecting running lamps of said first vehicle with running lamps of said second vehicle;

grounding means for establishing a common ground for said vehicle and said adaptor.

* * * * *